US011392481B1

(12) United States Patent
Yamane et al.

(10) Patent No.: US 11,392,481 B1
(45) Date of Patent: *Jul. 19, 2022

(54) AI FOR EVALUATION AND DEVELOPMENT OF NEW PRODUCTS AND FEATURES

(71) Applicant: Wells Fargo Bank, N.A., San Francisco, CA (US)

(72) Inventors: Marcus Yamane, San Anselmo, CA (US); Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/203,096

(22) Filed: Mar. 16, 2021

Related U.S. Application Data

(63) Continuation of application No. 16/596,528, filed on Oct. 8, 2019, now Pat. No. 10,956,300.

(51) Int. Cl.
| | |
|---|---|
| *G06F 9/44* | (2018.01) |
| *G06F 11/36* | (2006.01) |
| *G06N 20/00* | (2019.01) |
| *G06F 11/34* | (2006.01) |
| *G06F 8/77* | (2018.01) |
| *G06Q 10/06* | (2012.01) |

(52) U.S. Cl.
CPC ........... *G06F 11/3612* (2013.01); *G06F 8/77* (2013.01); *G06F 11/3414* (2013.01); *G06N 20/00* (2019.01); *G06Q 10/06393* (2013.01)

(58) Field of Classification Search
None
See application file for complete search history.

(56) References Cited

U.S. PATENT DOCUMENTS

| | | | |
|---|---|---|---|
| 7,169,085 B1 * | 1/2007 | Killin | G16H 20/30 600/595 |
| 8,417,715 B1 | 4/2013 | Bruckhaus et al. | |
| 8,639,567 B2 * | 1/2014 | Winters | G06Q 30/02 705/14.1 |
| 9,185,095 B1 | 11/2015 | Moritz et al. | |

(Continued)

OTHER PUBLICATIONS

Motiwalla et al., "Understanding Mobile Banking Usage Behavior: An Analytics Approach", Proceedings of the 2016 Pre-ICIS SIGDSA/IFIP, Dec. 11, 2016. 11 pages.

*Primary Examiner* — Anna C Deng
(74) *Attorney, Agent, or Firm* — Foley & Lardner LLP

(57) ABSTRACT

An AI agent may be trained using online session logs of actual customers interacting with an online software application. Datasets may be generated using the session logs, and the AI agent may be trained to use the online application by applying various machine learning techniques to the datasets. The AI agent may be provided login credentials and instructed to log into and perform specified tasks using the online application as part of training. Once trained, the AI agent may be instructed to perform the same or other tasks using a modified version of the application. The AI agent mimics the responses and behaviors of actual users of the modified application. The AI agent can be trained to mimic users sharing a certain demographic characteristic, and its performance can be used to more effectively and efficiently enhance the software application for users at large and/or for users in the demographic.

19 Claims, 11 Drawing Sheets

(56) References Cited

U.S. PATENT DOCUMENTS

| | | | |
|---|---|---|---|
| 9,516,035 B1 | 12/2016 | Moritz et al. | |
| 9,679,299 B2 | 6/2017 | Yoder et al. | |
| 9,911,290 B1 | 3/2018 | Zalewski et al. | |
| 9,990,643 B2 | 6/2018 | Yoder et al. | |
| 10,002,430 B1 * | 6/2018 | Mundhenk | G06V 20/52 |
| 10,140,820 B1 | 11/2018 | Zalewski et al. | |
| 10,621,164 B1 * | 4/2020 | Kain | G06F 16/215 |
| 10,796,228 B2 | 10/2020 | Roberts et al. | |
| 2009/0098524 A1 * | 4/2009 | Walton | G09B 5/14 |
| | | | 434/350 |
| 2009/0132347 A1 | 5/2009 | Anderson et al. | |
| 2012/0215635 A1 | 8/2012 | Ramer et al. | |
| 2012/0215639 A1 | 8/2012 | Ramer et al. | |
| 2012/0215640 A1 | 8/2012 | Ramer et al. | |
| 2017/0006135 A1 | 1/2017 | Siebel | |
| 2017/0221032 A1 * | 8/2017 | Mazed | G06Q 30/0639 |
| 2018/0001205 A1 * | 1/2018 | Osman | A63F 13/422 |
| 2018/0096362 A1 | 4/2018 | Kwan | |
| 2018/0211331 A1 | 7/2018 | Winters | |
| 2018/0247319 A1 | 8/2018 | Yoder et al. | |
| 2020/0159624 A1 * | 5/2020 | Malkov | G06N 20/00 |
| 2020/0272943 A1 | 8/2020 | Bowers et al. | |

* cited by examiner

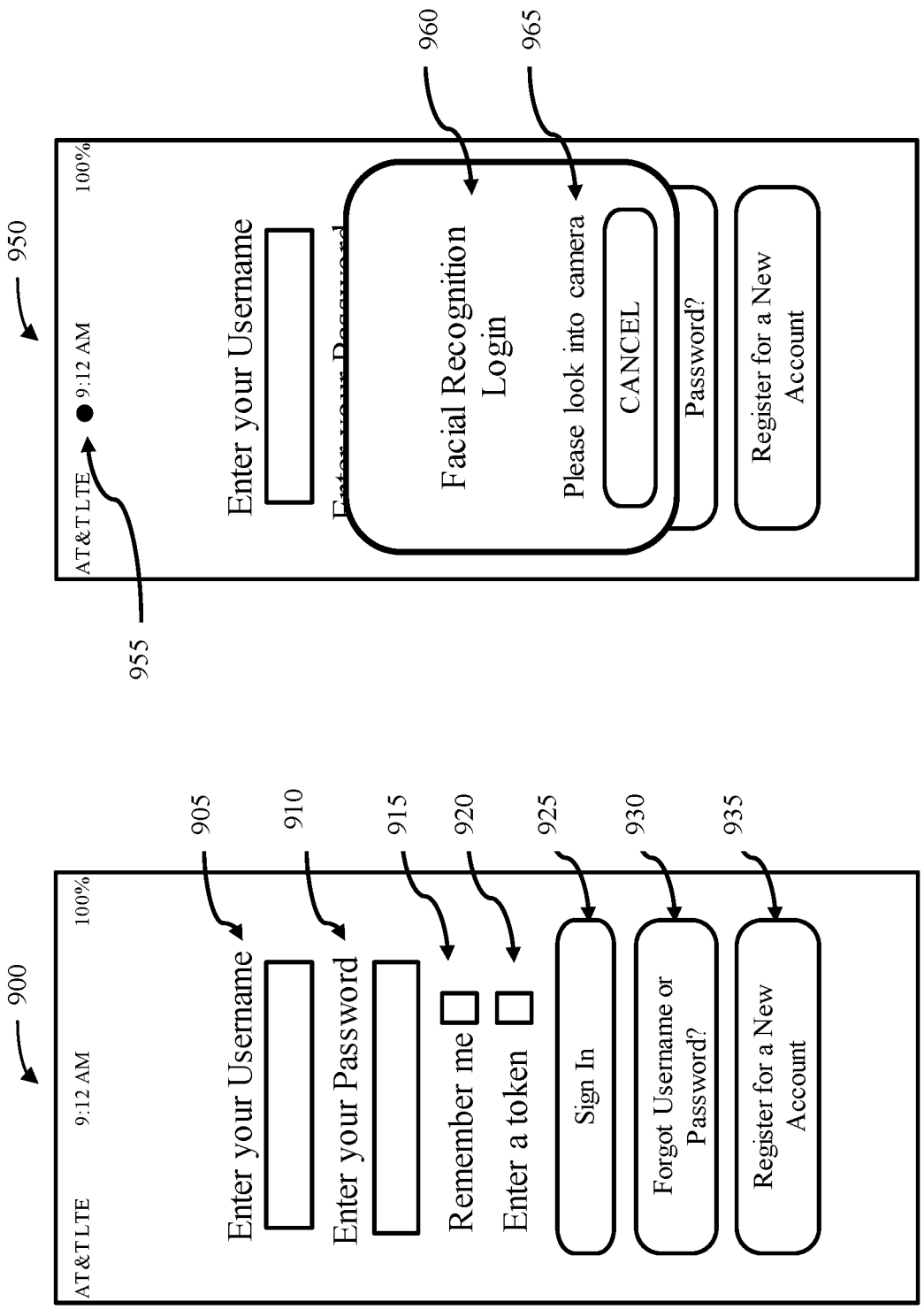

AI FOR EVALUATION AND DEVELOPMENT OF NEW PRODUCTS AND FEATURES

CROSS REFERENCE TO RELATED APPLICATIONS

This application is a continuation of U.S. patent application Ser. No. 16/596,528 entitled "AI FOR EVALUATION AND DEVELOPMENT OF NEW PRODUCTS AND FEATURES," filed Oct. 8, 2019 (now U.S. Pat. No. 10,956,300), which is incorporated herein by reference in its entirety.

TECHNICAL FIELD

The present disclosure relates generally to the use of Artificial Intelligence (AI) to more faithfully mimic the behaviors and responses of users to new products, designs, and/or processes, and to application of machine learning or deep learning techniques to train simulated users for evaluation and development of more effective, usable, and adoptable software applications.

BACKGROUND

In the digital era, users are able to access a variety of services through software applications, such as mobile applications on user devices, to perform various tasks. For example, customers may use an online banking application to deposit money, make payments, and use other functionalities. Software applications are often regularly reevaluated, updated, or otherwise modified in an effort to enhance usability, usefulness, and adoption, and thereby increase the size of the product's user base. Before a new or modified feature or product is publicly released, however, the feature or product may be tested with a user or a small group of users. But acquiring and using user reactions to develop new designs, products, and processes tends to be inefficient and/or ineffective. Research for product development provides data on user behaviors that may be evaluated for ways to improve products and increase user friendliness and usability, but much of the data on user habits and patterns is lost, insufficiently analyzed, or not representative of users at large, and the potential benefits of user research tend not to be fully realized.

SUMMARY

Various embodiments of the disclosure relate to a method, which may be implemented by a machine learning platform comprising at least one computing device, of training an artificial intelligence (AI) agent. The method may comprise generating a dataset using data in historical online session logs. The historical online session logs may include records of multiple users logging into and using a first version of an online software product. The method may comprise instructing the AI agent to apply machine learning techniques to the dataset to learn to use the first version of the online software product. The method may comprise providing to the AI agent login credentials that grant the AI agent access to the online software product. The method may comprise determining that the AI agent successfully performed the first task using the first version of the online software product. The method may comprise instructing the AI agent to use the login credentials to log into and use a second version of the online software product to perform a second task. The second version of the online software product may include one or more new or modified features not in the first version of the online software product. The method may comprise generating a report based on the AI agent logging into and using the second version of the online software product to perform the second task.

Various embodiments of the disclosure relate to a method which may be implemented by a machine learning platform. The method may comprise receiving a selection of an intended demographic of users of an online application. The method may comprise receiving historical session logs of users using the online application to perform a plurality of tasks. The users may share the intended demographic. The method may comprise applying machine learning techniques to the historical session logs to train a virtual user to use the online application to perform a task. The method may comprise instructing the virtual user to perform the task using a modified version of the online application. The method may comprise generating feedback on obstacles encountered by the virtual user completing the task using the modified version of the online application. The generated feedback may simulate feedback of users sharing the intended demographic.

Various embodiments of the disclosure relate to a method that may be implemented by a machine learning platform. The method may comprise receiving historical online session logs with records of a plurality of users using an online application. The method may comprise generating a plurality of datasets from the historical online session logs. The method may comprise training a virtual user to use the online application to perform tasks by using machine learning techniques on the datasets. A baseline understanding of navigating the online application for the tasks may be developed by training the virtual user. The method may comprise presenting the virtual user with a modified online application having a novel feature and directing the virtual user to complete a task using the modified online application. The method may comprise generating feedback on the difficulty faced by the virtual user in completing the task. The method may comprise identifying a subset of the plurality of users to target as an intended user based on the generated feedback. The subset of users may have a shared demographic.

Various embodiments of the disclosure relate to a platform that may be a machine learning platform for training an AI agent. The machine learning platform may comprise a computing system. The computing system may have a processor and instructions which, when executed by the computing system, cause the computing system to perform specific functions. The instructions, when executed, may cause the computing system to generate a dataset using data from historical online session logs. The historical online session logs may include records of multiple users logging into and using a first version of an online software product. The instructions, when executed, may cause the computing system to instruct the AI agent to apply machine learning techniques to the dataset to learn to use the first version of the online software product. The instructions, when executed, may cause the computing system to provide to the AI agent login credentials that grant the AI agent access to the online software product. The instructions, when executed, may cause the computing system to instruct the AI agent to use the login credentials to log into and use the first version of the online software product to perform a first task. The instructions, when executed, may cause the computing system to determine that the AI agent successfully performed the first task using the first version of the online software product. The instructions, when executed, may cause the computing system to instruct the AI agent to use the login credentials to log into and use a second version of the online software product to perform a second task. The second version of the online software product may include one or more new or modified features not in the first version of the online software product. The instructions, when executed, may cause the computing system to generate a report based on the AI agent logging into and using the second version of the online software product to perform the second task.

Various embodiments of the disclosure relate to a method implemented by a machine learning platform having a computing device. The method may comprise accepting a selection of a demographic characteristic of users. The users may be users of a first version of an online software application. The selection may be accepted by the computing device of the machine learning platform. The method may comprise extracting, from a set of historical session logs of users using the first version of the online software application, a subset of session logs of users having the demographic characteristic. The subset may exclude users not having the demographic characteristic. The method may comprise training an AI agent to use the first version of the online software application. The AI agent may be trained to use the first version of the online software application to perform a set tasks. The method may comprise instructing the trained AI agent to perform one or more tasks in the set of tasks using a second version of the online software application. The second version may be modified from the first version to include a feature not in the first version. The method may comprise generating a report. The report may be of the AI agent performing the one or more tasks using the first version of the online software application as compared with the AI agent performing the one or more tasks using the second version of the online software application. The report may be generated by the computing device of the machine learning platform.

These and other features, together with the organization and manner of operation thereof, will become apparent from the following detailed description and the accompanying drawings.

BRIEF DESCRIPTION OF THE DRAWINGS

FIGS. 9A and 9B depict example user interfaces of a user device showing different embodiments of logging into an online application, according to potential embodiments.

DETAILED DESCRIPTION

Figure 1:
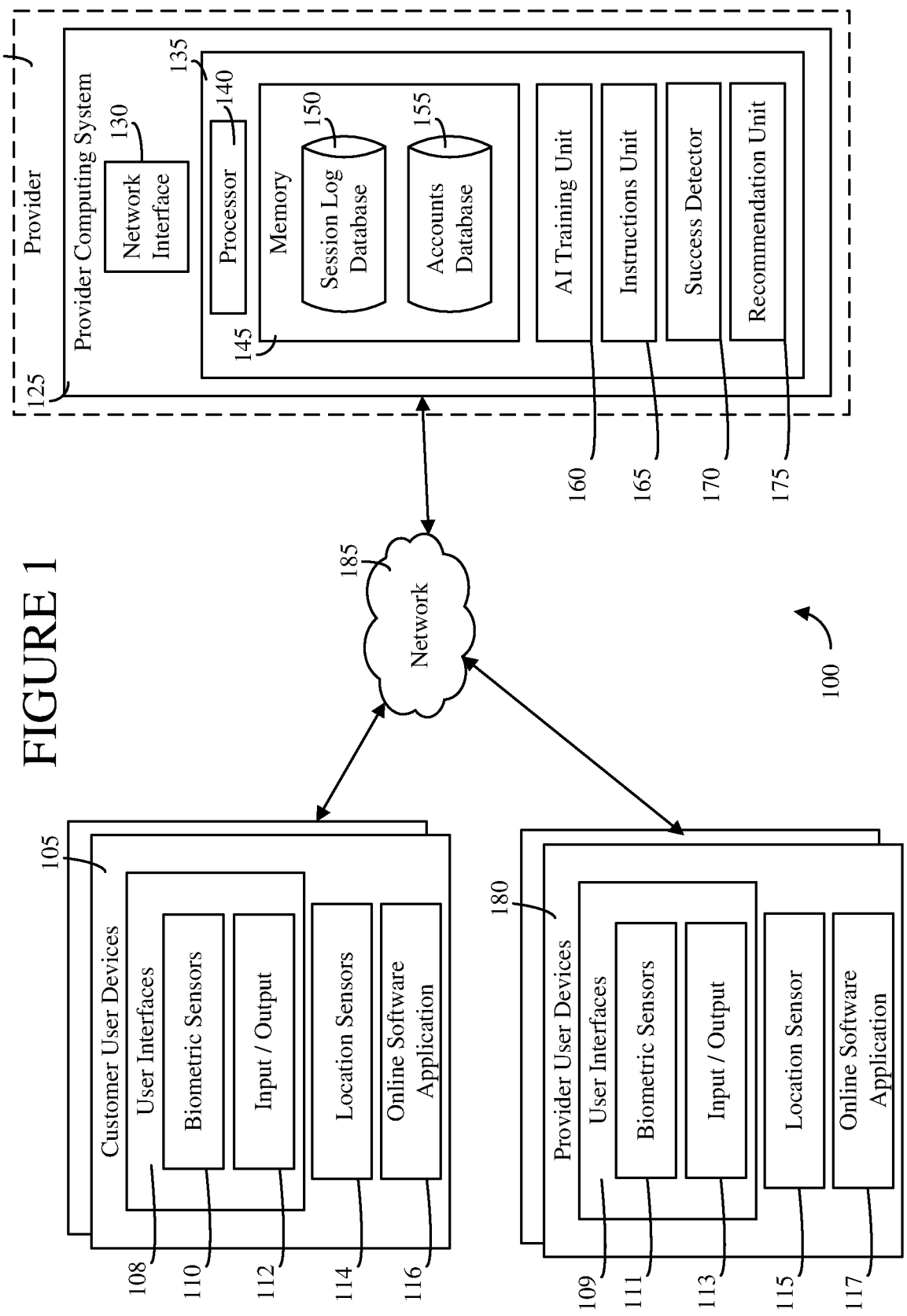
FIG. 1 is a block diagram of an example computer-implemented system, with a provider system in communication with various systems and devices, according to potential embodiments.

Various embodiments described herein relate to systems, methods, and devices for implementing Artificial Intelligence (AI) to evaluate and improve software products. When testing a new or redesigned software application with a user or small group of users, acquiring, analyzing, and using user feedback is a laborious process, and the usefulness of the feedback is limited, as the feedback tends to be more applicable to the particular users than to the greater population of users. Relying on the feedback of a few users may in fact lead product development astray and result in a product that is more user-friendly and adoptable for a small subset of users, but less user-friendly and adoptable for users at large. The disclosed approach better captures and represents the needs, preferences, and capabilities of a large and diverse population of users, and enhances targeting of products and features to varying users and different user populations.

In example embodiments, an AI agent may be trained to mimic the responses and behaviors of actual users of an online software application in redesigning the software application or developing a new software application. The AI agent may be trained using a very large number of session logs of actual customers using the software application. The potentially billions of user interactions with an online software application recorded in session logs captures users experiences better than the results of a test with a small group of users. Datasets may be extracted from or generated using the session logs, and the AI agent may be trained to use the online application by applying machine learning techniques to, or otherwise analyzing, the generated datasets and other customer information. In some embodiments, the AI agent may be provided login credentials and instructed to use the credentials to perform a specified task using the online application (e.g., make a bill payment) as part of the training process. The AI agent may be instructed to use the credentials to perform the specified task once the AI agent has reached a baseline proficiency level. The AI agent may be trained using one version of the online software product.

Once trained, the AI agent may be instructed to perform the same or other tasks using the same or other versions (with new or modified features) of the online software product. In some embodiments, the AI agent learns which steps may prevent customers from successfully completing the same task (e.g., steps that may cause error messages or the online application to time-out) as a result of the training. In some embodiments, the AI agent acts as a virtual or simulated user with particular demographic characteristics, such as, for example, user characteristics that are independent of the user's interaction with the online application (e.g., a certain age range or occupation), and/or characteristics based on user interactions with the application (e.g., how efficiently certain types of tasks or steps are performed, devices used to access the application, time of day the application is used in general or for particular tasks, etc.). In various implementations, an AI agent may simulate users in a given efficiency percentile (e.g., users in the bottom quartile in terms of efficiency, as a proxy for users who had the most difficulty using an application or feature) to determine whether that group of users fares better (e.g., is more efficient or experiences fewer obstacles such as error messages) when using a new version of an application and/or an updated feature set. In some embodiments, the AI agent provides recommendations of how to improve a modified version of the online application based on, for example, comparisons of performance of simulated users with different demographic characteristics. In some embodiments, the AI agent identifies demographic characteristic of customers most or least successful (as measured using, e.g., time taken to complete a task, fewest obstacles encountered, or number of screens navigated) in completing a task using the modified version of the online application, as compared to other demographics of users. A new or modified software product can potentially be tested, modified, and retested many times using the disclosed approach before the product is tested on, and/or released to, actual users, resulting in enhanced software products that can be developed sooner and at lower cost.

Embodiments of the AI agent described herein improve computer-related technology by performing certain steps that cannot be completed by conventional provider institution systems or humans themselves. For example, the AI agent is configured to proactively determine the feedback a customer may provide in response to a novel feature in a software product, and can adapt the feedback to represent a particular demographic of customer or to represent a general population of customers using the software product. In some embodiments, in order to attain improvements over conventional systems having databases and definitions that are static, the databases described herein may be data-type agnostic and configured to store different information for a variety of users, customer information, and the like. Furthermore, to achieve benefits over conventional customer research and analysis, the proficiency of the trained AI agent may generate multiple rounds of AI customer feedback on new products, changes to design, new processes, etc. for the online software product. Current methods of customer research and receiving customer feedback are time consuming and costly. The use of an AI agent as described herein may drastically increase efficiency of a provider institution system, reduce the cost of manual customer research, and decrease the amount of time needed before a new product, design, and/or customer facing processes may be released to users of the software product. Additionally, not all methods of manual customer research are handled consistently, which may be detrimental to the adequacy and value of the customer responses received during user research. By implementing AI to mimic customer reactions to aid with user research, the value of the simulated customer feedback may be higher for product development of the online software application. The terms "AI agent," "simulated user," and "virtual user" may be used interchangeably in certain embodiments of the disclosure.

Referring to FIG. 1, a block diagram of an example system 100 enabling training of an AI agent and generating feedback from the AI agent to mimic customer feedback of an online software application, according to potential embodiments, is depicted. The system 100 includes a provider computing system 125 (e.g., a computing system of a financial institution or other service provider), which may be implemented using one or more computing devices. The system 100 may also include one or more customer user devices 105 (e.g., smartphones, tablets, computers, wearable devices such as smartwatches, mobile phones, etc. used by the customers of provider 120) and provider user devices 180 (e.g., smartphones, tablets, computers, wearable devices such as smartwatches, mobile phones, etc. used by employees of the provider). The components of system 100 may be communicably and operatively coupled to each other over a network, such as network 185, that permits the direct or indirect exchange of data, values, instructions, messages, and the like (represented by the double-headed arrows in FIG. 1).

Each system or device in system 100 may include one or more processors, memories, network interfaces and user interfaces. The memory may store programming logic that, when executed by the processor, controls the operation of the corresponding computing system or device. The memory may also store data in databases. For example, memory 145 may store programming logic that when executed by processor 140 within processing unit 135, causes account database 155 to update information for a customer account with communications received from customer user devices 105. The network interfaces (e.g., network interface 130 of provider computing system 125) may allow the computing systems and devices to communicate wirelessly or otherwise. The various components of devices in system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

Provider computing system 125 may comprise an AI training unit 160. AI training unit 160 may execute machine learning techniques to train an AI agent on how to navigate an online software application. An instructions unit 165 may receive input from provider user devices 180 on a task for the AI agent to complete on the online software application and send those instructions to the AI agent to perform one or more tasks after the AI agent has "learned" how to use the online software application via AI training unit 160. Success detector 170 may, based on the outcome of the AI agent performing specified tasks as a simulated user, determine the ability of actual customers to complete the designated task that the AI agent performed. Recommendation unit 175 may summarize the success of the AI agent in completing one or more tasks using the online software application and generate a report providing feedback mimicking customer feedback and recommendations on which features of the software application may be improved. An example report may indicate, for example, that users in an identified demographic (e.g., certain age range) are more efficient or otherwise adept with respect to a particular login approach, screen, or menu structure as compared with other users in another identified demographic (e.g., another age range) or as compared with the average user. For example, the AI agent may identify a demographic of users falling within an age range (e.g., from 18 to 22) after determining, while testing a new version of the online application, users with that demographic more efficiently complete a certain task using the online application. In various embodiments, efficiency may be based on any combination of one or more metrics, such as time taken to navigate from a first point to a second point (e.g., from application launch, logon screen, or first input to a confirmation message, last input, or application close), average time taken to complete all steps or a subset of steps, number of "clicks" (e.g., menu selections or other entries or inputs), number of "retries" (e.g., making a set of one or more selections multiple times), number of times the same screen or page was unnecessarily encountered due to user selections (indicating, e.g., the user may have been "going in circles" while navigating menus), number and/or types of error messages, deviations from an "ideal" case in which, for example, a minimum number of user inputs is required by a hypothetical "power user," etc. Recommendation unit 175 may also provide suggestions of specific demographics of users that may use a novel feature of the software produce more or less successfully than other users. Session log information, such as logged information on how customers use the online software application of the provider for various tasks, may be stored in session log database 150. Customer account data (such as user profiles with customer personal information, account numbers, bill and payment histories, communications sent and received from the customer, etc.) for customers of provider 120 may be stored in accounts database 155.

Customer user devices 105 may include one or more user interfaces 108, which may include one or more biometric sensors 110 (such as an iris scanner, a fingerprint scanner, a heart monitor that identifies cardiovascular signals, etc.). User interfaces 108 may also include input/output components 112 that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more customer user devices 105 may include one or more locations sensors 114 to allow the customer user devices 105 to detect its location relative to other physical objects (e.g., an ATM or other customer user devices) or geographic locations. Example locations sensors 114 may include global positioning system (GPS) devices and other navigation and geolocation devices, digital compasses, gyroscopes and other orientation sensors, as well as proximity sensors or other sensors that permit the customer user device 105 to determine the presence and relative distance of nearby devices, objects, and/or locations. Online software application 116, which may be created and offered to customers by provider 120, may be run on the customer user devices 105. The customer user devices 105 may include additional client applications, such as an Internet browser presenting websites, and applications provided or authorized by the entity implementing or administering the provider computing system 125.

Provider user devices 180 may include user interfaces 109, biometric sensors 111, input/output components 113, location sensor 115, and online software application 117. The provider user devices 180 may be owned by employees or other agents of provider 120 in order to view the online software application 116 to help understand the application from a customer's perspective. As such, the online software application 117 that may be installed on provider user devices 180 may be identical to online software application 116, or modified versions of online software application 116 that is undergoing product development. Provider computing system 125 may communicate with provider user devices 180 via network 185.

Figure 2:
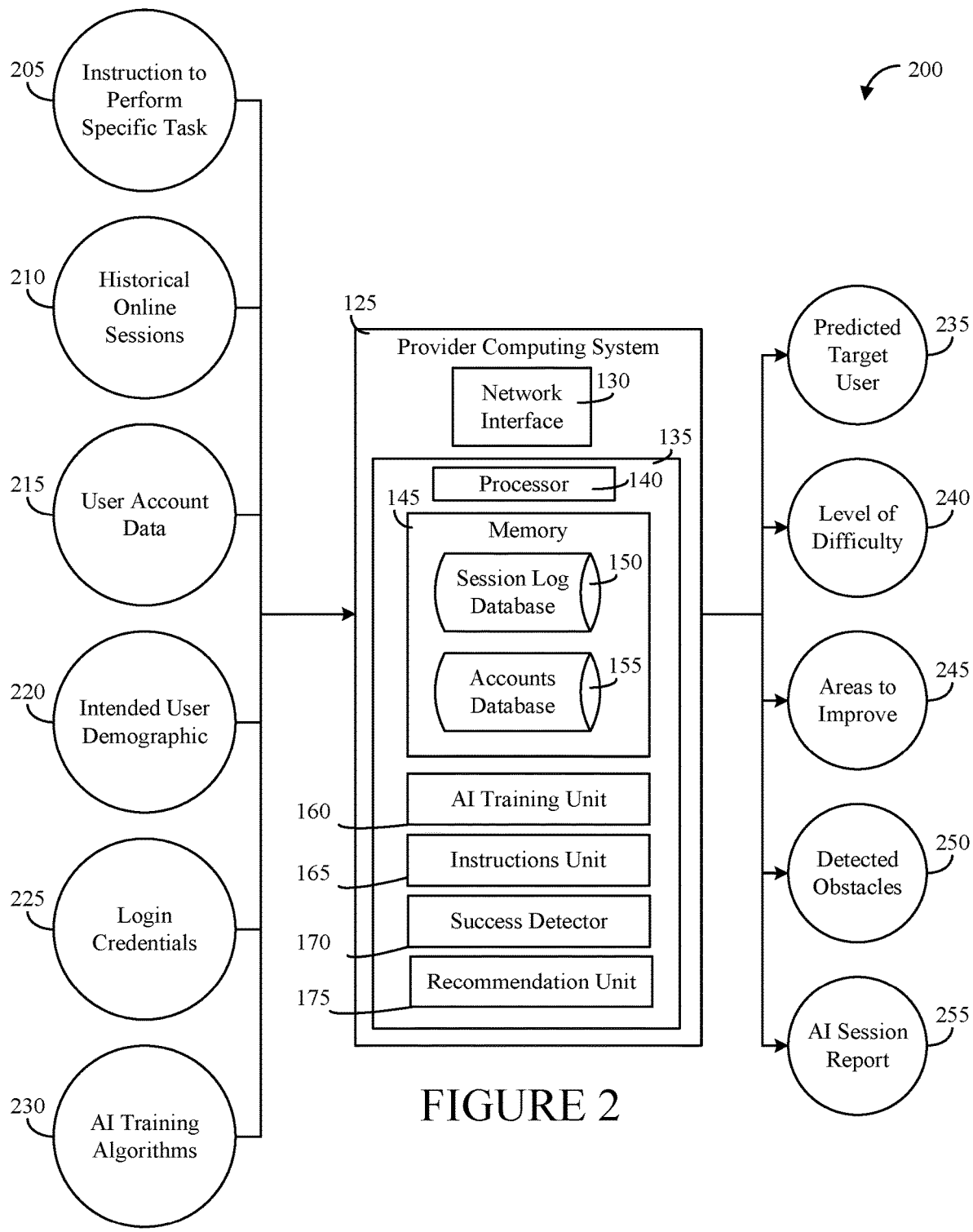
FIG. 2 depicts an example of data input into the provider computing system of FIG. 1 for an artificial intelligence (AI) agent and the outputs determined by the AI agent of the provider computing system, according to potential embodiments.

FIG. 2 provides an overview of data input into the provider computing system 125 of FIG. 1 and one or more outputs that may be determined by the AI agent of the provider computing system, according to potential embodiments. The inputs into provider computing system 125 may be provided by communications received via network 185 from one or more user devices (e.g. customer user devices 105 and provider user devices 180) and/or other systems within provider 120. For example, an employee of the provider may enter an intended user demographic for a novel feature of the software application via a laptop communicably connected to network 185. Example inputs to provider computing system 125 may include "Instruction to Perform Specific Task" input 205, "Historical Session Logs" input 210, "User Account Data" input 215, "Intended User Demographic" input 220, "Login Credentials" input 225, and "AI Training Models" input 230. "Instructions to Perform Specific Task" input 205 may be a direction sent to instructions unit 165 from a provider user device 180 for the AI agent to perform a task related to a novel feature of the online software application that is being tested during the research and development stage. For example, during testing of a new login feature, "Instructions to Perform Specific Task" input 205 may indicate to the AI agent to try logging into a banking application using facial recognition (as, for example, a user with an intended demographic) instead of manual entry of a username and password.

"Historical Session Logs" input 210 may include a multitude of digitally stored online sessions logs generated from use of or interaction with a software application by customers associated with customer user devices 105. The information from "Historical Session Logs" input 210 may be stored in session database 150 of provider computing system 125 and used in AI training unit 160 to teach an AI agent how to use the online software application. Historical online session logs may contain session information on customers using a variety of features of the software application, such as logging on, checking balances, viewing a latest deposit, depositing checks, making payments, viewing bills, scheduling transactions of funds, etc. The online sessions may contain a variety of data the AI agent (i.e., a virtual user) can gather on customers' online habits, tendencies, patterns and trends while interacting with the online software application (e.g., a banking application of the provider institution). As such, the AI agent may determine normal or abnormal customer behavior when simulating customer use of the online software application.

"User Account Data" input 215 may include information on customer profiles, such as banking account information, payment history, and personal information (e.g., age, education level, occupational status, number of children, current address, race, gender, health and/or disability information, etc.). The variety of data from "User Account Data" input 215 may be received via communications through network 185 and stored in accounts database 155 within provider computing system 125. "Intended User Demographic" input 220 may be provided as a demographic of customer that a new feature of the online software application is expected to be utilized by more heavily than by other users. For example, a new feature may include bank savings accounts for high school students, in which "Intended User Demographic" input 220 may be customers from 14 to 18 years of age. In another implementation, "Intended User Demographic" input 220 is a requested demographic selected by a provider user device 180 for the AI agent to use as a demographic of customer to mimic. In one example, the AI agent may only be taught using information from online sessions created by a customer with "Intended User Demographic" input 220. Thus, instead of the AI agent generating feedback on how the general population of customers may respond to the online software application, the AI agent may generate feedback on how that specific, selected demographic of customers may respond to the online software application and any modified versions.

"Login Credentials" input 225 may be used in AI training unit 160 and/or instructions unit 165 to further develop the understanding of the virtual user on how to navigate the online software application. "Login Credentials" input 225 may, in certain examples, be information needed by the virtual user (i.e., AI agent) to be able to complete particular relevant tasks from "Instruction to Perform Specific Task" input 205, such as if the AI agent is instructed to login to the online software application in testing a new login design or interface. "Login Credentials" input 225 may include a username and password, an access code, biometrics (simulated), or other data or methods that may be used to, for example, access a software application or an online portal.

"AI Training Models" input 230 may include a variety of machine learning techniques that are used in classification and pattern recognition of data acquired from "Historical Session Logs" input 210 and "User Account Data" input 215 to determine normal patterns of user behavior and to identify any unusual outlier data points. Regression algorithms may also be included in "AI Training Models" input 230 for the AI agent to decide which data points are the most important causal factors that drive certain results. Additionally, "AI Training Models" input 230 may include decisioning algorithms which may drive the system to analyze situations to decide what the best course of action may be based on the available options the AI agent may take. For example, the virtual user may consider situations from "Historical Session Logs" input 210 and/or while performing a task on a modified version of the online application and encountering several options on how to proceed. Clustering algorithms may also be included in "AI Training Models" input 230. During situations when it is uncertain to the AI agent how to classify a result or dataset, clustering algorithms may be applied to classify the result in a specific category because it is within a specific distance to a cluster of other data points.

One or more outputs of provider computing system 125 may include "Predicted Target User" output 235, "Level of Difficulty" output 240, "Areas to Improve" output 245, "Detected Obstacles" output 250, and "AI Session Report" output 255. "Predicted Target User" output 235 may include a demographic of customer identified as having encountered the least amount of obstacles while the AI agent was performing the task specified by "Instruction to Perform Specific Task" input 205. For example, based on the AI agent successfully completing a task related to a novel feature while embodying the customer demographic of a 20 year old, and not successfully completing the same task while embodying an older demographic of users, the AI agent may output a predicted target user with an age from 18 to 25. In some implementations, the recommended demographic of users in "Predicted Target User" output 235 is different than the requested demographic from "Intended User Demographic" input 220. The identified, recommended demographic of users in "Predicted Target User" output 235 may be expected to encounter no more obstacles than encountered by the virtual user simulating users sharing the selected demographic from "Intended User Demographic" input 220.

"Level of Difficulty" output 240 may include a generated numeric value or category for how difficult a general population of customers may find completing a task on the software application and/or of how difficult a specific demographic of customer may find completing the task. The task evaluated for difficulty to customers may be the task from "Instruction to Perform Specific Task" input 205. For example, level of difficulty 240 may be a number from on a scale of 1 to 10, with 1 being "Extremely Easy" and 10 being "No Calculated Chance of Successfully Performing Task" generated in success detector 170. In other implementations, "Level of Difficulty" output 240 may be written or audible feedback generated by the AI agent that provides a measurement for or otherwise indicates how difficult the task may be for the general population of customers or for customers in a specific demographic (e.g., 65 year old men). The determination of "Level of Difficulty" output 240 may incorporate factors such as customer friendliness, ease of use, and ability to overcome obstacles while completing the task for a version of the software product.

"Areas to Improve" output 245 may be generated in recommendation unit 175 and may identify specific steps or points in a modified version of the online application at which customers experienced obstacles while trying to complete a task. For example, if the task a customer is trying to complete is logging in with facial recognition, an area to improve output 245 may include written feedback. The written feedback, for this example, may be for a customer who was unable to use facial recognition because of a shattered camera and was also unable to locate the option to change to a different identity verification mode (e.g., with username/password or touch ID) within a time-out error limit. In another example, the AI agent may use (as its "face" or other biometrics) a historical profile with facial (or other) characteristics corresponding to a user in an intended demographic to test a new facial recognition (or other biometric detection) feature of the online application. Additionally or alternatively, a face (or other biometric) may be simulated based on, for example, an "average" of users in the demographic. In examples involving facial recognition, user faces may be averaged by, for example, averaging values for a set of facial characteristics, such as width and/or height of face, distance between eyes, hair style and/or length, height and/or width of eyes, etc. In some implementations, one or more faces may be selected at random from among faces of users, or all faces may be selected, and the task performed one or more times using each selected face. In certain implementations, a face of one or more users (or an average of multiple users) who, for example, least or most efficiently logged into the application may be used. The testing by the AI agent, in this example, may determine if the facial recognition feature has problems detecting users with darker skin, users with gray hair, users wearing glasses and/or hats, etc. Then "Areas to Improve" output 245 may identify the circumstances in which users had issues with the facial recognition feature, and therefore the provider may be aware of the complications with the new feature and correct them before production of the online application is finished. "Detected Obstacles" output 250 may include a generated list of problems encountered while the virtual user was working through completing the task given in the instructions to perform specific task input 205. In some implementations, "Detected Obstacles" output 250 includes problems such as error messages, time-out errors, force quit errors, and/or other bugs in the online software application. For examples, a potential obstacle includes receiving an error message or not progressing any further beyond a certain point after a certain amount of time.

"AI Session Report" output 255 may show a summary of information pertaining to the AI session that was generated by provider computing system 125 on the online software product. "AI Session Report" output 255 may provide visual or auditory feedback on the virtual user's experience using a modified version of the online software application with a novel feature, after the AI agent is trained to mimic customers. In certain implementations, the AI session report may include a digitally stored walkthrough of the AI agent using the software product (e.g., an AI session video log) that is sent to provider user devices 180 as the outcome of testing the new product. In some embodiments, "AI Session Report" output 255 includes a comparison between the AI session log of the AI agent using a second version of the online software application to perform a task and historical online session logs of customers using the online software application. "AI Session Report" output 255 may include options for a user of provider user devices 180 to run a new test of the product with the AI agent simulating different demographics of customers or with the AI agent simulating customer feedback on a different aspect of the new software product. Previous AI session report outputs generated on older versions of the software application or on different products may be stored in memory 145 of provider computing system 125. The generated feedback from "AI Session Report" output 255 may be used by the AI agent to provide modifications to the online application to enhance usability of the application.

In other implementations, there are additional or fewer inputs into provider computing system 125 and/or additional or fewer outputs. Further, the outputs of provider computing system 125 may factor as inputs to calculations of specific outputs (e.g., "Detected Obstacles" output 250 can also be used to determine "Areas to Improve" output 245 and "Level of Difficulty" output 240). Additionally, AI session report 255 may include options to select the other outputs (e.g., "Predicted Target User" output 235, "Level of Difficulty" output 240, "Areas to Improve" output 245, "Detected Obstacles" output 250) to view more concise information, and as such the other outputs may all be used as data inputs when generating "AI Session Report" output 255.

Figure 3:
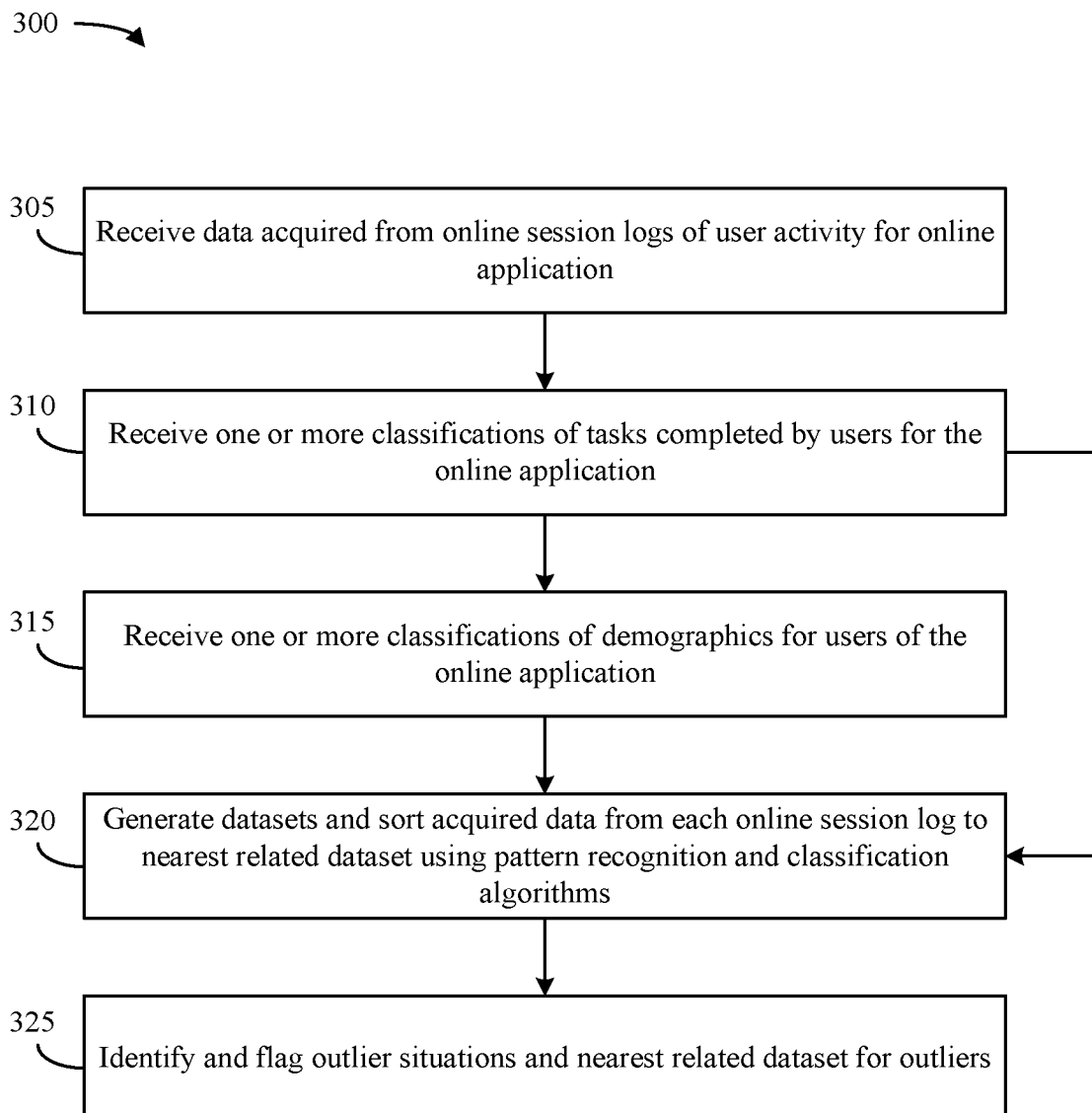
FIG. 3 depicts an example approach for sorting and generating datasets to be fed to the AI agent to use during training, according to potential embodiments.

FIG. 3 provides an overview of process 300 of an example approach for classifying and creating datasets to be used for training a virtual user, according to potential embodiments. The process may be implemented by provider computing system 125, with involvement by one or more customer user devices 105 and provider user devices 180. At 305, provider computing system 125 (via, e.g., AI training unit 160) may receive acquired data from online sessions of user activity for an online application from customer user devices 105. The acquired data may also be received from provider user devices 180 which may previously have stored the online session information of user activity. The acquired data from the online sessions may be received in real-time or near real-time (e.g., as user activity is created by customers currently accessing the online application), or periodically (e.g., on a daily, weekly, or different time basis). In some embodiments, at 305, data is also acquired on user information regarding the online application through customer surveys, correspondence (e.g., emails) with customers on user experience with the online application, etc. which have been collected and stored in the memory of provider computing system 125. Customer user devices 105 and provider user devices 180 may be any devices through which the online software application can be downloaded on and interacted with by the respective users. Provider user devices 180 may be a part of provider computing system 125 or separate therefrom in different implementations.

At 310, provider computing system 125 (via, e.g., AI training unit 160) may receive one or more classifications of tasks completed by users for the online application from provider user devices 180 or from classifications of possible tasks stored in memory 145 of provider computing system 125. In some embodiments, classifications of tasks include making payments, viewing bills, accessing account balances, transferring funds to other users or accounts of third-party devices, depositing checks, logging on, etc. for the online software application of the provider. In some implementations, classification of tasks may be determined from information received via customer requests, surveys, and/or emails during a research and development stage of a new product on desired abilities for users of the online application. The classification of tasks may be used to generate datasets to be fed to the AI agent of provider computing system 125 in order to have the AI agent learn how to operate and navigate the online software application.

At 315, provider computing system 125 (via, e.g., AI training unit 160) may receive one or more classifications of demographics for users of the online application via customer user devices 105 or from input received from provider user devices 180 before beginning the process of training the virtual user or as the virtual user is training. In some embodiments, process 300 continues to step 320 without performing step 315. Additionally or alternatively, classifications of demographics for users (i.e., the customers) of the online application may be acquired from account database 155. The categories of demographics for users may include age, gender, race, occupation, education level, health, disabilities, whether glasses are worn, apparent computer savviness (based on, e.g., how efficiently certain steps or tasks are performed), use of certain devices (e.g., laptops, smartphones, wearables, etc.), financial sophistication (e.g., credit score or number of bankruptcies), efficiency percentile in performing certain tasks, etc. Using the acquired information from steps 305, 310, and 315, provider computing system 125 may generate datasets by sorting the acquired data from each historical online session log to the closest related dataset using one or both of pattern recognition and classification algorithms. The generated datasets may be sorted by a data field or aspect of a task, such as the user attempting to complete a payment using the software application, which will be further apparent with the description of FIG. 8. Sorting may help group and categorize the information extracted from the historical session logs the AI agent received at 305. For example, if k-means clustering is used, the data from an online session may be sorted to the nearest cluster that is numerically the shortest distance away from the data acquired from that particular online session.

As the data acquired from the historical online sessions are being categorized and sorted into numerous datasets using machine learning techniques and algorithms, provider computing system 125 may monitor the sorting of the acquired data, or review the sorted data, for unusual information from online sessions. At 325, AI training unit 160 of provider computing system 125 may identify and flag outlier situations and the nearest related dataset for each outlier situation. If data acquired from an online session is deemed as an outlier, provider computing system 125 may decide to have the data go unused (e.g., by being excluded or subsequently removed) to prevent skewing testing results after the AI agent is trained, or may decide to have a category for flagged outlier situations in some embodiments. Process 300 may end after a certain amount of acquired data has been sorted into the generated datasets, or may continue to sort the data from the online sessions as more user activity of the online software application is created by customers.

Figure 4:
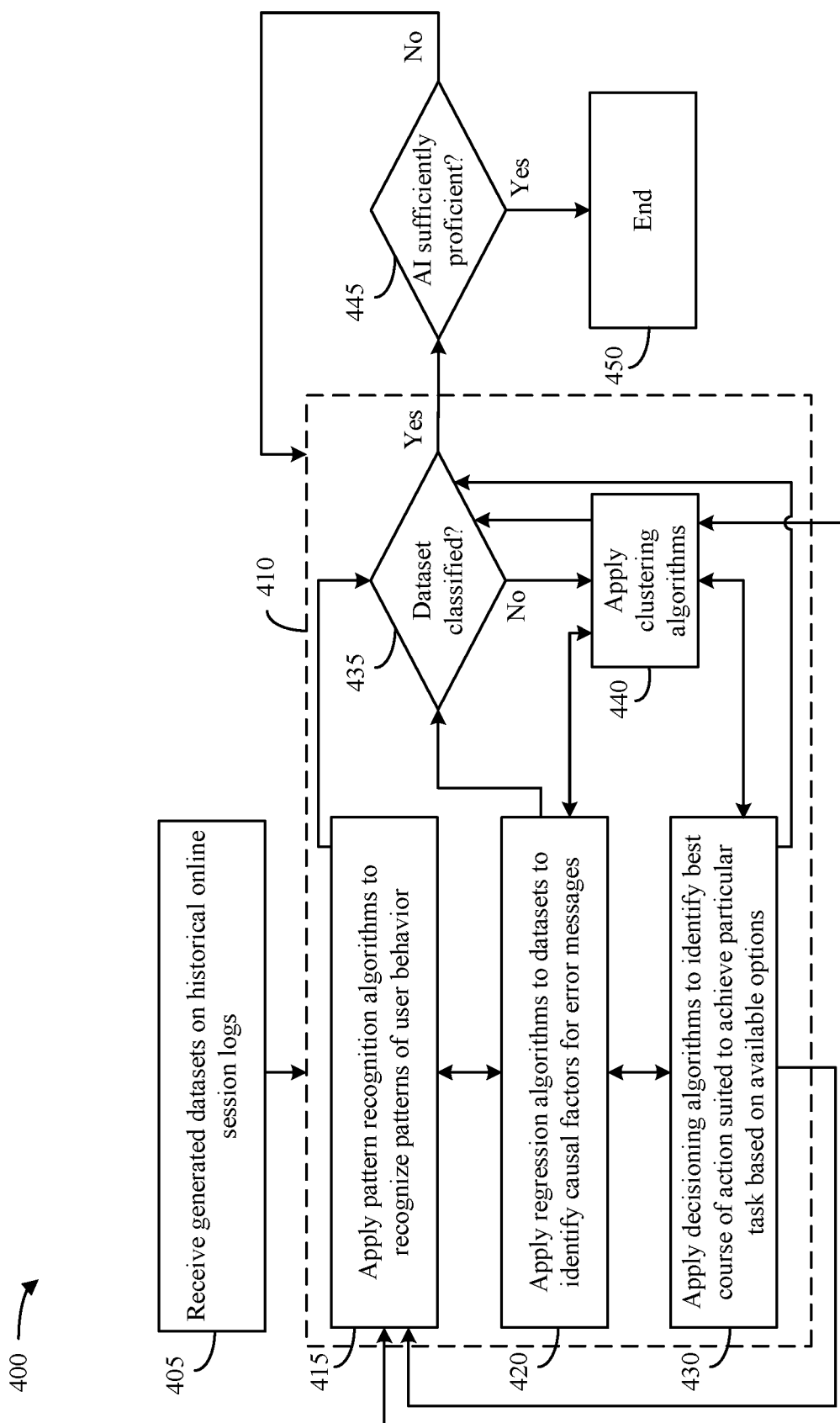
FIG. 4 depicts an example approach for applying various techniques to the generated datasets for training an AI agent to reach a proficiency level, according to potential embodiments.

FIG. 4 shows a process 400 of an example approach for applying various models to the generated datasets for training an AI agent to reach a certain proficiency level, according to potential embodiments. Process 400 may be implemented by provider computing system 125 within AI training unit 160 and with executable instructions stored in memory 145 for applying various machine learning techniques. Input of which models to use, or of the modified models to be used, to generate the datasets also may be received via network 185 from provider user devices 180. At 405, provider computing system 125 may receive generated datasets on historical online sessions, which may be generated in AI training unit 160. In some implementations, the generated datasets are created by sorting, categorizing, extracting, and/or manipulating acquired data from the online sessions through process 300 described in reference to FIG. 3.

After step 405, process 400 proceeds to 410, where provider computing system 125 may apply machine learning techniques to train the AI agent (i.e., virtual user). The machine learning techniques may be executed by the processor of provider computing system 125 and updated through input from provider user devices 180 (such as a computer of an employee of the provider updating an algorithm and sending the executable code via network 185). The algorithms may encompass a variety of machine learning techniques that are carried out in AI training unit 160 to teach the AI agent how to operate the online software application. AI training unit 160 may also teach the AI agent to complete tasks for the software application while being "self-aware" in order to notice where customers, who are not taught how to navigate the application, may experience difficulties or obstacles when trying to accomplish a specific task. This "self-awareness" of the AI agent may allow the AI agent, which acts as a virtual user, to provide a response at the end of testing the software product that mimics feedback of different customers (e.g., customers with different demographic characteristics). At 415, provider computing system 125 (via, e.g., AI training unit 160) may apply pattern recognition algorithms to recognize patterns of user behavior. Regression algorithms may be applied by provider computing system 125, such as by AI training unit 160, to identify causal factors for error messages (step 420). For example, at 420, regression algorithms may be employed to develop the AI agent's understanding of what are common causes for specific types of error messages. Some examples of regression techniques that may be used by the AI agent include linear regression models, logistic regression models, Support Vector Machine (SVM) techniques, Least Absolute Selection Shrinkage Operator (LASSO) regression models, polynomial regression models, and other regression tree models.

At 430, provider computing system 125 may apply decisioning algorithms to identify a best course of action suited to achieve a particular task based on the available options to the AI agent. The AI agent may be instructed to perform the task (e.g., from instructions to perform specific task input 205) of paying a utility bill, simulating a virtual user logged into a customer account of the online application, and may have multiple options to reach the pay bill user interface. As such, the AI agent may need to ascertain which option is best for successfully navigating to the pay bill user interface in the most efficient manner. The decisioning algorithms may also be applied to train the AI agent to decide what course of action to take while simulating a certain demographic of user (e.g., a customer who is over 70 years in age), even if it is not the course of action to successfully complete the task. The AI agent may be trained to determine what actions certain customers might take in order to learn what mistakes customers may make. Consequently, the AI agent may report those problems at the end of simulating customer use of the online application (e.g., in "AI Session Report" output 255).

At 440, if a dataset of customer information is deemed unclassified (435), AI training unit 160 may apply clustering algorithms to employ additional machine learning techniques to classify the dataset into the nearest related cluster. The number of clusters may be communicated to provider computing system 125 from provider user devices 180 to limit or expand the training of the AI agent, or may be variable depending on the data acquired from the historical online sessions. In some embodiments, the number of clusters can be predetermined so as to fit the tasks from the online sessions and user activity of customers into a preferred number of clusters. In various embodiments, the cubic clustering criterion (CCC) statistic may be calculated (from SAS procedure FASCLUS) to determine the maximum number of clusters to allow for training the AI agent.

In some implementations, demographic values and success values of completing a task on the online application in the set can be categorized using a k-means clustering algorithm that is unsupervised, with no dependent variable associated therewith. Alternatively or additionally, other approaches can be used to detect a sequence or pattern of behavior in the demographics of customers and completing various tasks on the online software application successfully. For example, long short term memory (LSTM) recurrent neural networks (RNNs), gradient boosted trees, logistic regression, hidden and basic Markov models, and frequent pattern growth algorithms may be utilized in classifying patterns and decisions while training the AI agent.

In some embodiments, clusters may be developed using, for example, Python, SAS, R, Spark and/or H20. In certain versions, k-means clustering may be developed using the SAS FASTCLUS procedure, which performs a disjoint cluster analysis on the basis of distances computed from one or more quantitative variables. The observations may be divided into clusters such that every observation belongs to one and only one cluster. The clusters do not form a tree structure. The FASTCLUS procedure uses Euclidean distances, so the cluster centers are based on least-squares estimation. This kind of clustering method is often called a k-means model. The clustering aims to partition n observations into k clusters in which each observation belongs to the cluster with the nearest mean. The final cluster centers are the means of the observations assigned to each cluster when the algorithm is run to complete convergence. Each iteration reduces the least-squares criterion until convergence is achieved.

For example, given a set of observations $(x_1, x_2, \ldots, x_n)$, where each observation is a d-dimensional real vector, k-means clustering aims to partition the n observations into k(≤n) sets S={S$_1$, S$_2$, ..., S$_k$} so as to minimize the within-cluster sum of squares ("WCSS") (i.e. variance). Formally, the objective is to find:

$$\operatorname{argmin} \sum_{i=1}^{k} \sum_{x \in S_i} \|x - \mu_i\|^2 \qquad \text{Eq. 1}$$

where μ$_i$ is the mean of points in S$_i$.

While provider computing system 125 executes the machine learning techniques, one technique may be applied (such as at 415) before a different type of machine learning technique is carried out (such as at 420). Instead of proceeding to 430, however, it may be needed to apply the same machine learning technique used before (such as repeating 415) to make a new decision or after discovering a new situation of user activity (which is represented by the double arrows between different steps in process 400). For example, process 400 may continue to step 435 to check whether a dataset is classified after 415, 420, 430, or 440. In some embodiments, after 430 is executed, process 400 may continue to 415, 420, or 440, for further training instead of continuing to step 435. In other embodiments, 440 is executed before checking whether the dataset is classified at 435 (e.g., 415 continues to 440 and/or 420 continues to 440). Additionally, after clustering algorithms are applied at 440, process 400 may continue to 415, 420, 430, or immediately recheck whether the dataset is now classified by proceeding to 435, in some examples. This multidirectional flow in process 400 may occur when more pattern recognition algorithms or other machine learning techniques are needed to help the AI agent learn how to respond to a new online banking scenarios. In various embodiments, provider computing system 125 (via, e.g., AI training unit 160) may determine how to proceed throughout process 400 at least in part based on user inputs from provider user devices 180.

At 445, AI training unit 160 of provider computing system 125 may determine whether the AI agent has achieved a sufficient proficiency level. The proficiency level may be determined by users of the provider user devices 180, which may be based on whether a more intelligent, "self-aware" AI agent (e.g., an AI agent that is capable of simulating users belonging to one of multiple potential demographics and is capable of comparing users based on demographic characteristics) is desired or may be based on how much time and processing power is available to train the AI agent further to reach a more intelligent proficiency level. If a new version of an online software product needs to be tested immediately before a demonstration of the product, an AI agent that is "fully trained" more quickly may be preferred, even if the cost of the saved time is a less proficient virtual user. The proficiency level of the AI agent may be determined based on a number of scenarios the AI agent has simulated as a virtual customer and/or based on the extent of the machine learning techniques applied to a certain number of datasets fed to the AI agent in provider computing system 125. If, at 445, it is deemed that the AI agent is not sufficiently proficient, process 400 may continue to 410 to further train the AI. On the other hand, if it is deemed that the AI agent has reached a desired proficiency level, process 400 may end at 450, representing the end of teaching the virtual user how to use the online application to simulate how a customer may navigate the online application.

Figure 5:
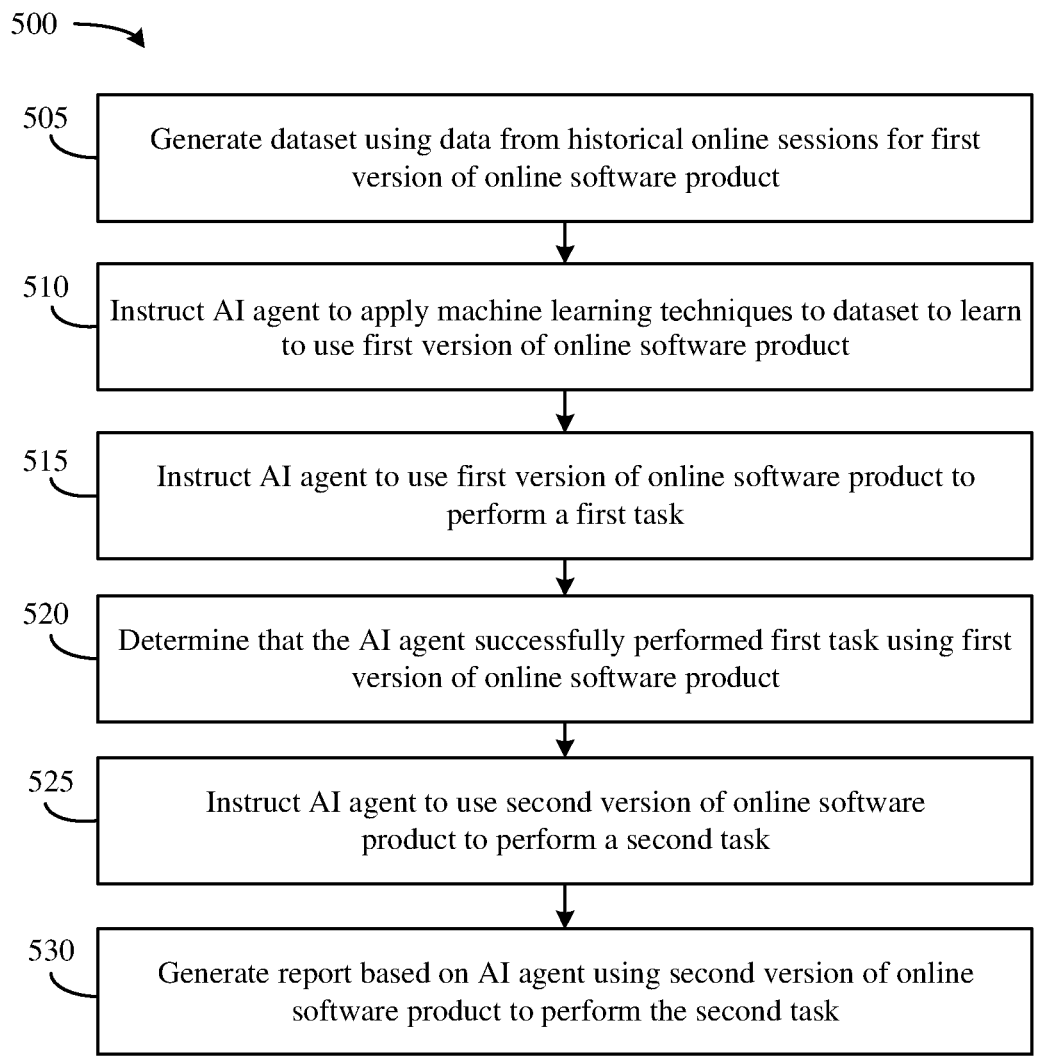
FIG. 5 depicts an example approach for generating feedback from an AI agent to mimic customer feedback in response to instructions to complete tasks using an online software product, according to potential embodiments.

Referring to FIG. 5, an overview of an example approach for creating feedback from an AI agent to simulate customer feedback on different versions of an online software product, according to potential embodiments, is depicted. At 505, provider computing system (via, e.g., AI training unit 160) may generate datasets using acquired data from historical online session logs for a first version of an online software product. The datasets may be created using a process similar to process 300 described with reference to FIG. 3, or a similar process with the steps in an alternative order. The first version of the online software product may be an older version of an online application that a provider desires to update for better customer experience. At 510, the AI agent may be instructed to apply machine learning techniques to datasets to learn how to use the first version of the online software product (e.g., online software application 116). AI training unit 160 may be configured to carry out step 510 using executable code received from "AI Training Models" input 230. In some embodiments, provider computing system 125 performs process 400 at 510. Provider computing system 125 may instruct the AI agent to use the first version of the online software product to perform a first task at 515. In some implementations, the first task is related to a function that may be performed using online software application 116, such as depositing checks, making payments, looking at a latest deposit, checking balances, logging on, etc. In some embodiments, the AI agent may be provided with login credentials (e.g., via "Login Credentials" 225) and instructed to use the login credentials to perform the task at 515. Example login credentials include, for example, username and password, an access code, biometrics (simulated), or other data or methods that are used to gain access to the online software product or a portal or account, etc.

At 520, provider computing system 125 (via, e.g., instructions unit 165) may determine that the AI agent successfully performed the first task using the first version of the online software product. The first task given to the AI agent may be to check that the AI has been taught to a proficient level on how to use the online software product for various banking situations. The AI agent may be instructed to use a second version of the online software product to perform a second task at 525. The second version of the online software product may be modified from the first version online software product to include a novel product, design feature, or customer facing processes. As such, customer reactions may be desired to see how users might respond to the novel feature in the second version of the online software product. At 530, provider computing system 125 (via, e.g., success detector 170 and recommendation unit 175) may generate a report based on the AI agent using the second version of the online software product to perform the second task. Information the AI agent determines in success detector 170, such as problems encountered while trying to perform a specific task or other function, may be input to recommendation unit 175 to include in the generated report. The report created at 530 may include a summary of the AI session log and the ability to view the activity of the AI agent (e.g., in a video of the AI session log display via a user interface).

Figure 6:
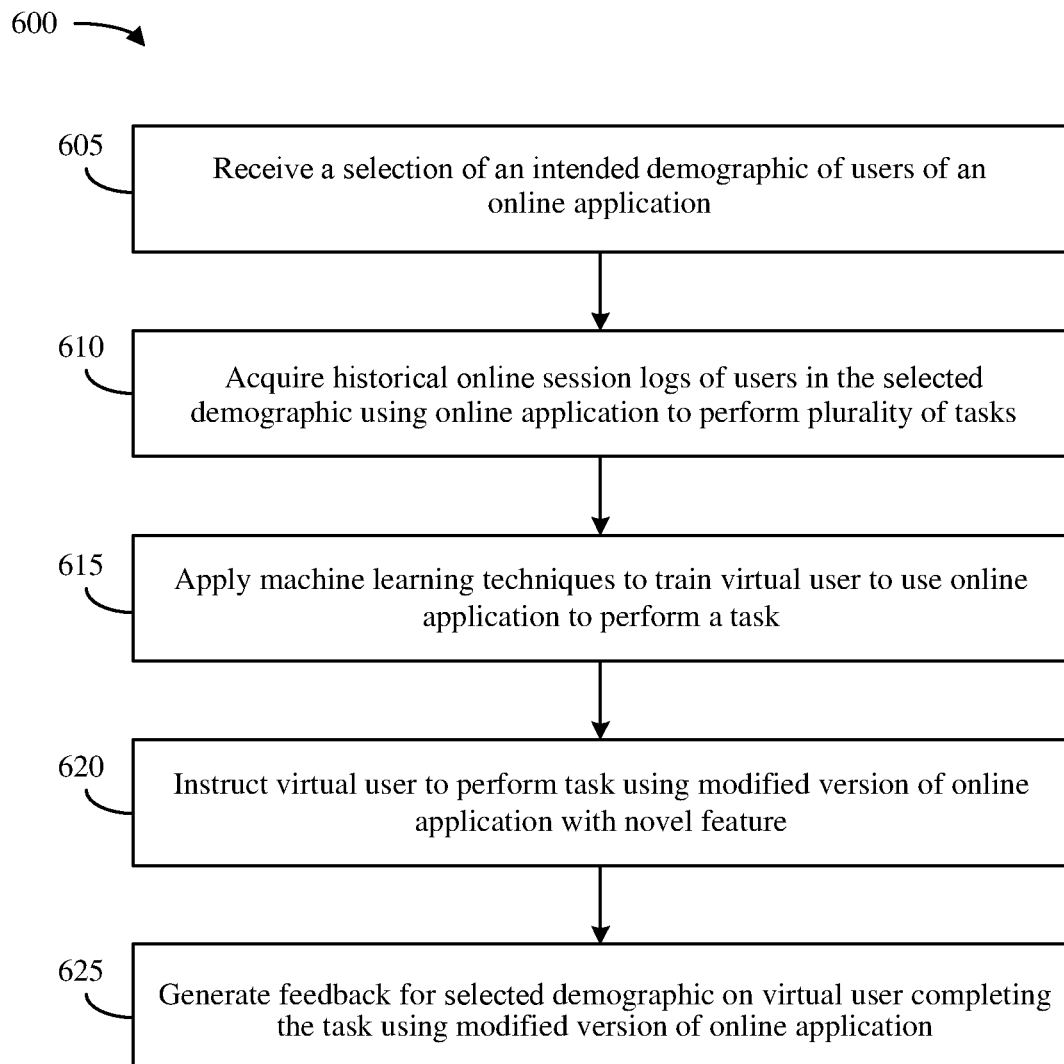
FIG. 6 depicts an example approach for generating feedback from a virtual user to mimic customer feedback of an identified demographic of users for a modified version of an online application, according to potential embodiments.

FIG. 6 provides an overview of process 600 of an example approach for creating feedback from a virtual user that simulates feedback of an intended demographic of users, according to potential embodiments. At 605, a selection of an intended demographic of users of an online application may be received. The intended demographic of users may be selected via input from a provider user device 180, such as intended user demographic input 200, which may be received by the provider computing system via network 185. In some embodiments, the selected demographic of users is a request for the AI agent to mimic feedback from a customer having that selected demographic. Example demographics of users may include age range, gender, employment status, highest education level, current education status, sensory deficiencies, size of family, user health, geographic location, language(s) spoken, device or software environment used to access the software application (e.g., smartphone vs. tablet vs. laptop, iOS vs. Android vs. Windows), technological experience or savviness, etc. The demographics of users may be self-reported, determined from account records or various data sources, estimated based on various metrics or proxies, etc. For example, the AI agent may determine the age range of a customer from birthdate information stored in accounts database 155. The selected demographic of users may be customers that the provider institution is planning on marketing to as primary users for a novel feature of online software application 116. At 610, provider computing system 125 may acquire historical online session logs of users in the selected demographic using the online application to perform a plurality of tasks. For example, the virtual user may filter previously received or stored online session log information for the online session logs created by customers with the requested demographic characteristic.

Machine learning techniques may be applied at 615 to train a virtual user to use the online application to perform a specific task. AI training unit 160 may be configured to carry out step 615, in a similar procedure as process 400. Provider computing system 125 may instruct the virtual user to perform a task using a modified version of the online application with a novel feature at 620. Process 600 may proceed to step 620 once the virtual user achieves a sufficient proficiency level on how to respond to various online banking situations for the application. The virtual user may be navigating the online application with the intended demographic of user "in mind." For example, the virtual user may embody the personality of the intended demographic of customer while performing the instructed task, in order to be aware of what problems that demographic of customer may run into while using the online application. The virtual user may be "self-aware" of the demographic of user the virtual user is simulating while navigating the online application. The virtual user may thus provide feedback at the end of testing the online application with a novel feature that mimics feedback of a selected, intended demographic of user, or may identify one or more other demographics of users (e.g., customers of different ages, technological backgrounds, education levels, etc.) based on test results as users to target in improving a product or in marketing a product.

At 625, feedback for the selected demographic may be generated on the virtual user completing the task using the modified version of the online application (via, e.g., recommendation unit 175). The feedback generated by the virtual user may simulate the reactions of customers with the specified demographic to the modified version of the online application. By providing more narrow customer responses to modified versions of the online application, the virtual user may allow provider institutions to determine if they need to market to a different demographic of the general population, or whether the reaction of the general customer population, as a whole, was positive. This may allow provider institutions to analyze feedback mimicking customer reactions for users who may be very difficult to get responses from or who may not respond to customer surveys or emails to manually retrieve feedback.

Figure 7:
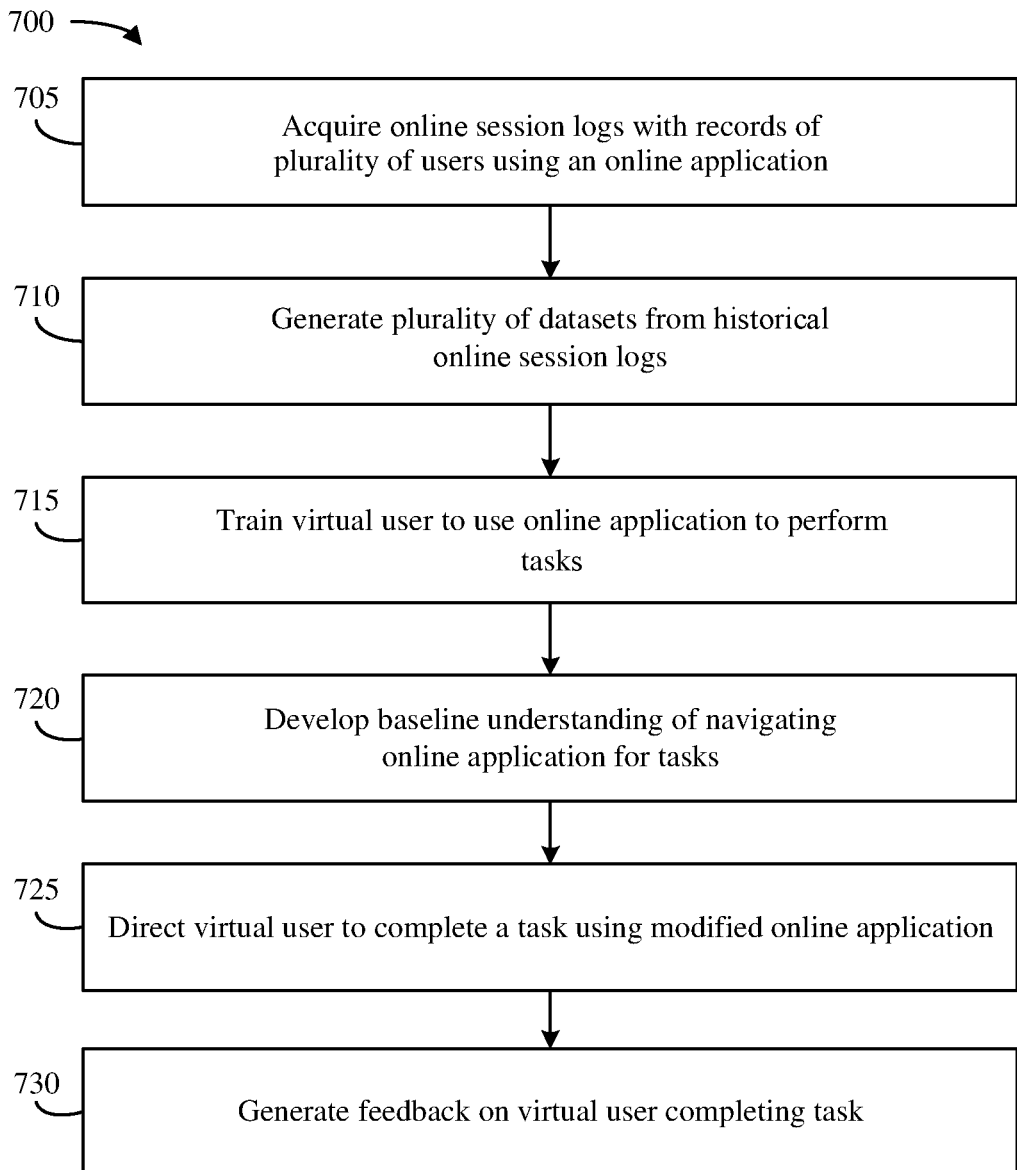
FIG. 7 depicts an additional example approach for generating feedback from a virtual user to mimic customer response to a modified online application, according to potential embodiments.

Referring now to FIG. 7, process 700 of an additional example approach for creating feedback from a virtual user to mimic customers navigating a modified online application, according to potential embodiments, is depicted. At 705, provider computing system 125 may acquire online session logs with records of a plurality of users (e.g., customers of the provider) using an online application. The acquired online session logs may be stored in session log database 150 or in other parts of memory with provider computing system 125. At 710, a plurality of datasets from the session logs may be generated (e.g., using process 300, described with reference to FIG. 3) by provider computing system 125. The datasets may be generated based on what type of task a user was trying to accomplish using the online application, or may be generated using other classification types, such as the demographic of customers using the online application.

Provider computing system 125 may train a virtual user to use the online application to perform tasks at 715. At 715, AI training unit 160 may be configured to train the virtual user with the same procedure as in process 400, or may use additional or fewer machine learning techniques depending on how sophisticated of a virtual user is desired by the provider institution. At 720, provider computing system 125 may develop a baseline understanding for the virtual user of navigating the online application to perform tasks. The baseline understanding may be determined based on how many online banking scenarios the virtual user has successfully dealt with, or may be determined based on training the virtual user for a specific amount of time. The virtual user may be directed to complete a task using the modified online application at 725. For example, from "Instruction to Perform Specific Task" input 205, the virtual user may be directed to use a facial recognition feature to log on to the online application instead of a more conventional login with a username and password. At 730, provider computing system 125 may generate feedback, simulating customer reactions, on the virtual user completing the task. Obstacles that the virtual user encountered, recommendations on what areas to improve for the modified online application, a level of difficulty in completing the specific task, and other responses may be included in the generated feedback from the virtual user.

Figure 8:
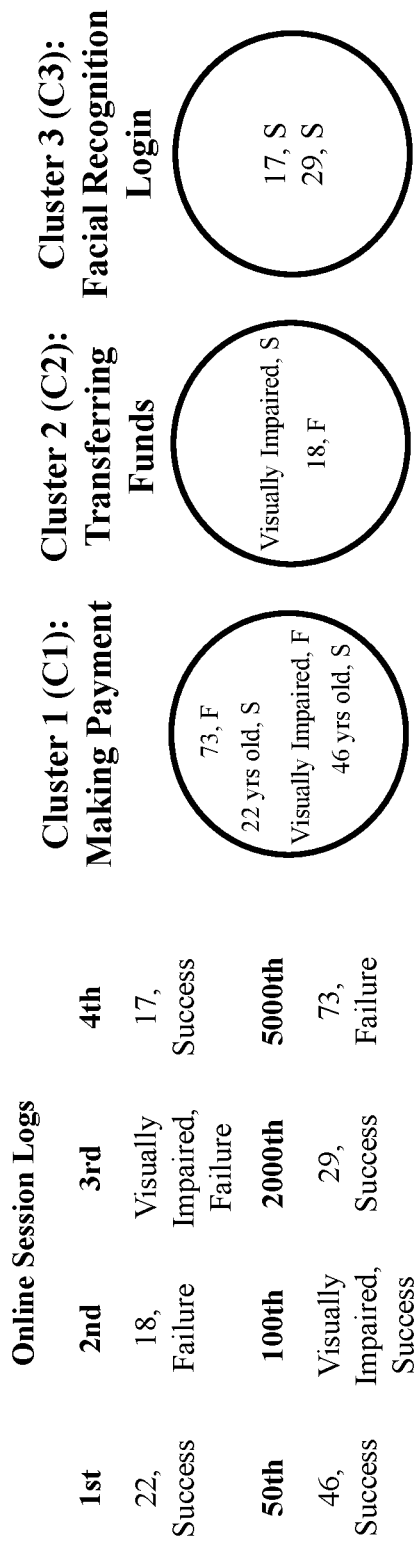
FIG. 8 depicts an overview of an example approach to sorting online session logs into generated datasets using clustering on the specific task for an online application, according to potential embodiments.

FIG. 8 provides an example of how data acquired from historical online session logs may be clustered into datasets generated by AI training unit 160, in some implementations. In some embodiments, thousands to hundreds of thousands or more online session logs are input into the provider computing system 125 to be analyzed and extract data to use in training an AI agent. In other implementations, the datasets of clusters are further generated using customer information from complaints, previously saved customer feedback, and survey responses of user. The online sessions may already be stored in memory of the provider computing system (e.g., in online session database 150), or may be received from additional customer user devices 105. The cluster categorizations, shown as C1, C2, and C3, may be organized into historical task categories (e.g., the one or more classifications of tasks received at 310 in process 300) for an online software application. Data that may be acquired from the online session logs by the AI agent may include a demographic of customer and whether the customer was successful at completing a task for the online application (shown as a pair (x,y) in FIG. 8, with x as the demographic and y as either a success (S) or failure (F)). In other examples, data acquired from the online session logs may include other continuous or discrete values, such as time taken by the customer to perform a step or overall task or the number or types of error messages the customer encounters during the session, which may be used during sorting by the AI agent.

An example of two demographics are shown in FIG. 8, age range and sensory deficiencies (e.g., a user who is visually impaired or hearing impaired). For example, from the second online session log, a customer who was 18 years of age was unable to complete a successful transfer of funds using the software product (shown in C2 as (18, F)). Cluster 1 (C1) may include the data acquired from the online session logs where the user was attempting to make a payment, Cluster 2 (C2) may include the data acquired from the online session logs where the customer was attempting to transfer funds to other users or accounts, and Cluster 3 (C3) may include data acquired from the online session logs where the customer attempted login using a facial recognition feature for the online application. In some implementations, the amount of clusters may have no maximum amount of clusters, or may have a specified amount of clusters given as input from provider user devices 180 to simplify the process of data classification.

Referring to FIG. 9A, example graphical user interface (GUI) 900 may be presented (via, e.g., AI training unit 160 and/or instructions unit 165) when the task for the virtual user to perform is to login to the online software product, according to some embodiments. GUI 900 may be a current user interface for the online software product that is interacted with (via, e.g., customer user devices 105) by customers during the historical online sessions digitally stored in provider computing system 125. Username text window 905 and password text window 910 may be selectable by a user (e.g., the owner of a customer user device 105) to enter input via GUI 900 to access their customer accounts. In some implementations, a virtual user is given a username and password for a mock customer account to test the login process to the online software product. For example, during process 500 at 520, a username and password may be included in the input to provider computing system 125 (e.g., "Login Credentials" 225), along with instructions to perform the task of logging into the online software application using GUI 900. The AI agent may test that a selectable "Remember Me" checkbox 915 and a selectable "Enter a token" checkbox 920 saves the preferences selected or generates a correct text window to the customer for entering a token.

GUI 900 may provide various activatable icons/links for selecting several functions that may be performed via instructions unit 165 and on customer user devices 105 and provider user devices 180. For example, an icon 925 for signing in may allow for initiating logging onto a customer account and proceeding to the home page of the online software product; an icon 930, for when a user forgets the password or the username of their customer account, may allow for navigating to a page to send an email with directions on creating a new password for the online application; and an icon 935 for registering a new customer account (such as a new savings account with a financial institution) may cause the online software product to load a page where the user may fill in personal contact information to begin the registration process.

FIG. 9B provides an overview of an example GUI 950 of a second version of the online software product with a modified feature that may be presented to the virtual user to perform a task, according to potential embodiments. GUI 950 may be a new version of the online software product that needs to be tested and that the provider institution may desire feedback for that mimics how customers may respond to the new version. For example, a second version of the online software product may include an option for facial recognition login instead of a more standard username and password login. The AI agent may examine "Facial Recognition Login" text 960 and facial recognition instructions text 965 to determine whether customers may prefer a different layout, smaller icon, or more options than those presented in example GUI 950. The virtual user may also determine whether the camera 955 and iris scanner are successfully configured to receive input from a customer using a customer user device 105 with online software application 116 installed.

Figure 10B:
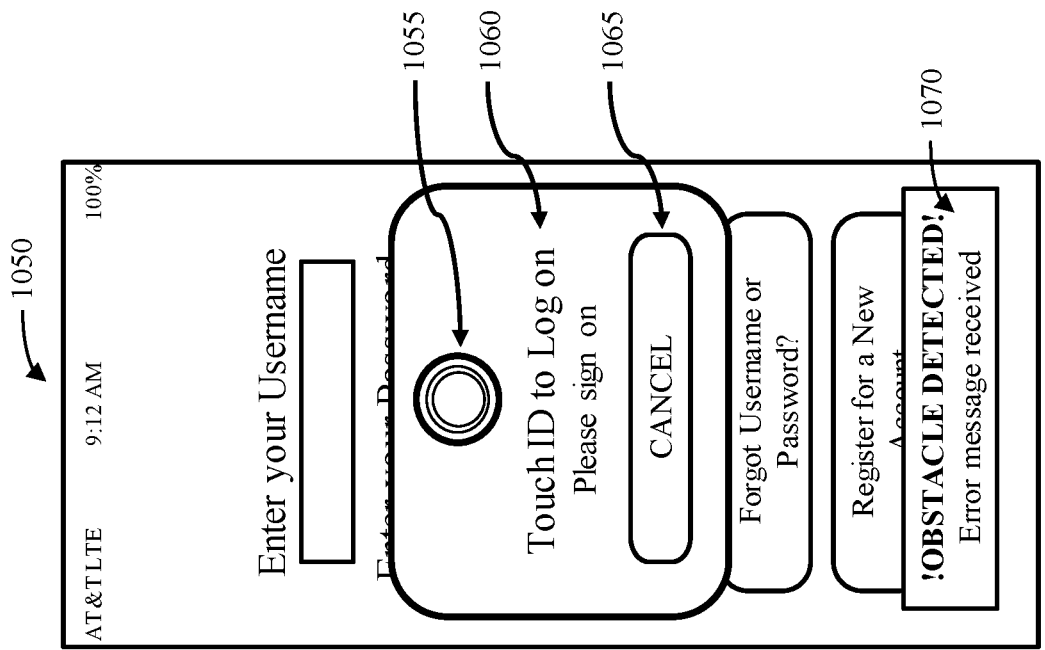
FIGS. 10A and 10B depict example user interfaces of a user device associated with a provider showing different embodiments of viewing a session log created by an AI agent, the AI agent mimicking customer use, according to potential embodiments.
Figure 10A:
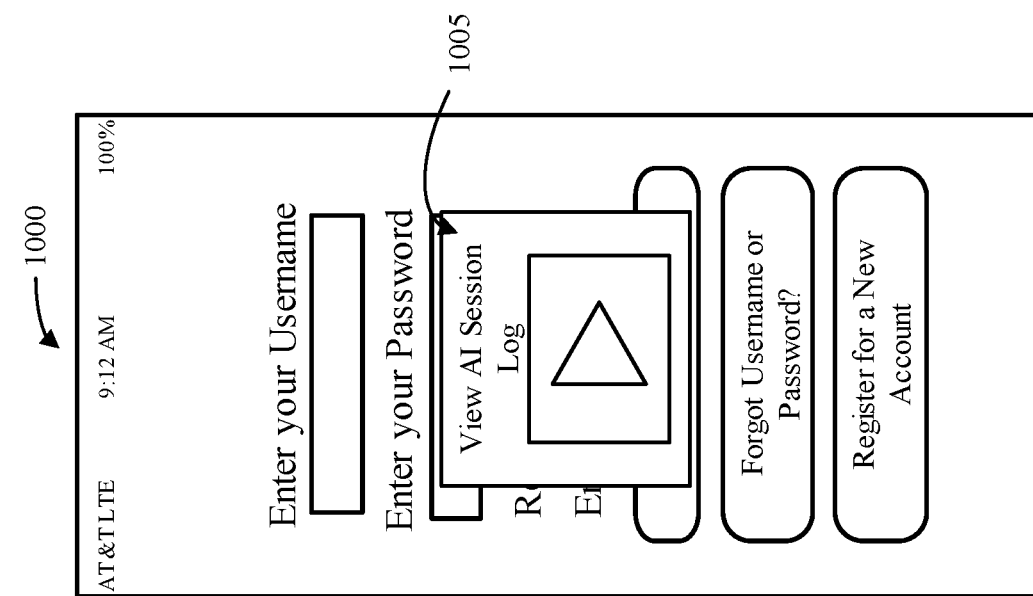

Referring to FIG. 10A, an example user interface 1000 for viewing a virtual user online session is depicted, according to potential embodiments. User interface 1000 may be generated via success detector 170 of provider computing system 125 and displayed to users of provider user devices 180. Frame 1005 may provide an activatable icon/link for starting the AI agent online session walkthrough. In other implementations, other activatable icons may be provided to restart the AI session log, return to a generated "AI Session Report" output 255, or view other videos of AI session logs, among other options. The AI session log may be generated after the AI agent is finished training with the machine learning techniques and is executing a task for a modified version of an online application in order to generate feedback mimicking customer reactions. In some embodiments, the AI session log of the AI agent logging into and using a second version of an online software product to perform a task is compared with the historical online session logs in order to generate the AI session report (e.g., AI session report 255).

FIG. 10B provides an example screenshot 1050 of a user interface while viewing the virtual user online session, according to potential embodiments. If a user of a provider user device selects the icon in frame 1005 with reference to FIG. 10A to begin playing the AI session log, screenshot 1050 of the user interface may occur after the AI agent has navigated through a certain amount of steps. For example, screenshot 1050 may occur approximately three minutes after the icon in frame 1005 is activated and the AI session log starts playing. The AI session log may be "slowed down" proportionally to simulate a video log of an actual user. The time the user is expected to take to complete each step in the process may be determined, and the AI session log video may be generated so as to simulate how fast an actual user might go through the steps. For example, the AI agent, simulating a certain user (such as an average user in the general population of customers or a user of a certain demographic), may determine that the user is expected to take a certain time (e.g., 5, 10, or 15 seconds) for certain steps (e.g., login, select account, or enter amount) in the process of performing a certain task (e.g., paying a bill). The video of the AI session log may then be generated accordingly, for example, in real time or at a multiple thereof (e.g., twice as fast or half as fast). Longer or shorter pauses might be expected at certain steps depending on how much time is needed for, for example, downloading or uploading content (e.g., screens with more content that require larger downloads, or that require more data upload, might slow down some users of certain devices or users with certain slower network connections), how much time is needed to progress past a set of prompts (e.g., more textual content to read in prompts may slow down at least some users in progressing through a task), etc. Touch ID image 1055, login instructions text 1060, and the "Cancel" icon 1065 may be, at least in part, a new feature in a modified version of the online software application that the virtual user is trained to use and is testing. As the user of provider user device 180 is watching the AI session log, obstacles the virtual user encountered while completing the specified task may be displayed in pop-up alert windows, such as pop-up alert window 1070. Pop-up alert window 1070 may indicate what type of obstacle was detected by the AI agent and may also be an icon that can be interacted with by the user of provider user devices 180. For example, pop-up alert window 1070 may be presented to allow the user to select the window, thus exiting a video of the AI session log, and to present the user with a new text window. The new, presented text window may provide more information on where the obstacle was detected (e.g., minute 5:23 of the AI session log) and why the AI agent mimicking a customer had problems with a feature in the online software application.

Figure 11:
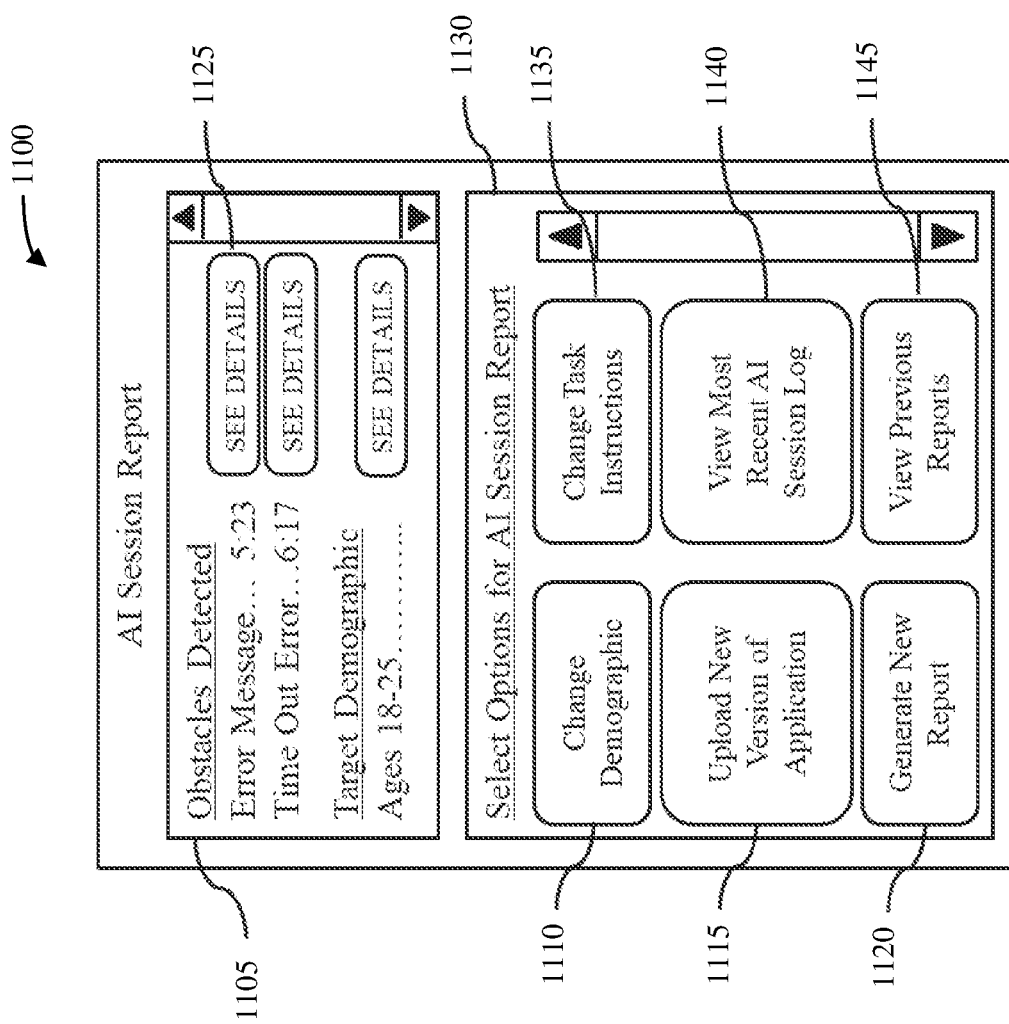
FIG. 11 depicts an example of a generated report on an AI session log, showing several options presented to a user from the provider institution for viewing information on the session log and feedback from the AI agent, according to potential embodiments.

Referring to FIG. 11, example GUI 1100 may be presented (via, e.g., recommendation unit 175) showing an "AI Session Report" when the trained virtual user finishes completing one or more specific tasks for an online software application, according to potential embodiments. At frame 1105, problems encountered by the virtual user while navigating the online application and recommendation information may be provided to the user, such as the owner of a provider user device 180. A list of detected obstacles in frame 1105 may indicate, for example, obstacles encountered by the AI agent while completing a certain task using a second version of the online software product, but that were not encountered by the AI agent while completing the same (or another) task using a first version of the online software product.

Frame 1105 may also present recommendations to a user based on feedback from the trained virtual user (such as a demographic characteristic of users to target, areas of a version of the online software that may need improvement, etc.) or other information on the progress of the AI session using the application (such as a level of difficulty of a second specific task that the AI agent was instructed to complete). Frame 1105 may have selectable icons/links to choose various functions available to the user. For example, icons are provided for each recommendation or encountered obstacle to allow the user to view more detailed information via a "See Details" icon 1125. A text window may be generated when "See Details" icon 1125 is activated by the user, listing additional feedback on the information in the report, such as how the virtual user determined the information and/or ways to improve features of the online software application that caused obstacles. The "Target Demographic" text in frame 1105 may be a subset of users that were represented in the generated datasets by the AI agent as users predicted to be capable of successfully using a second version of the online software product more efficiently than an average user (e.g., a customer of the general population). The subset of users specified in the AI session report as a "Target Demographic" for a new feature may share a demographic of user, such as customers who have a certain occupation or who all are currently enrolled in a university.

Frame 1130 may present several activatable icons/links for selecting various functions for the generated AI session report that may be performed via one or more provider user devices 180. For example, frame 1130 allows options to be provided to the user to: change a demographic of customer for the AI agent to mimic via a "Change Demographic" icon 1110; upload a different version of the online application, such as a modified version with a new feature to be tested, via "Upload New Version of Application" icon 1115; create a new AI session report, which may send an instruction to the AI agent to perform a different selected task or to begin learning a new selected version of the online software product, via "Generate New Report" icon 1120; change one or more task instructions, which may create a new "Instruction to Perform Specific Task" input 205, via a "Change Task Instructions" icon 1135; view the most recently generated session log of the virtual user via a "View Most Recent AI Session" icon 1140; and/or view old AI session reports via a "View Previous Reports" icon 1145." The frames in GUI 1100 may include scroll bars on the right side to allow users of provider user devices 180 to scroll to and view additional selections, capabilities, and information that may not fit inside the portion of the frame visible to the user when first presented with the corresponding frame of GUI 1100 on the display screen. In some implementations, GUI 1100 is viewed by an employee of the provider institution in order to view various feedback generated by the virtual user to mimic a general population of customers or a more narrow demographic of customers.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, implemented by a machine learning platform comprising a computing device, of training an artificial intelligence (AI) agent, the method comprising:
  generating, by the computing device, a dataset using data in historical session logs that include records of multiple users logging into and using a first version of a software product;
  instructing, by the computing device, the AI agent to apply machine learning techniques to the dataset to learn to use the first version of the software product;
  providing to the AI agent, by the computing device, login credentials that grant the AI agent access to the software product;
  instructing, by the computing device, the AI agent to use the login credentials to log into and use the first version of the software product to perform a first task;
  determining, by the computing device, that the AI agent successfully performed the first task using the first version of the software product;
  instructing, by the computing device, the AI agent to use the login credentials to log into and use a second version of the software product to perform at least one of the first task or a second task, wherein the second version of the software product includes one or more new or modified features not in the first version of the software product; and generating, by the computing device, a report based on the AI agent logging into and using the second version of the software product to perform the first task or the second task.

2. The method of claim 1, wherein the AI agent applies one or both of a pattern recognition model and a classification model to the dataset to recognize normal patterns of user behavior and identify unusual or outlier behaviors while using the software product.

3. The method of claim 1, wherein the AI agent applies a regression model to the dataset to identify causal factors for one or more error messages that could be received while using the software product.

4. The method of claim 1, wherein the AI agent applies a decisioning model to the dataset to identify actions suited to achieving particular tasks based on available options while using the software product.

5. The method of claim 1, wherein the AI agent is instructed to learn to use the software product as a representative user having a demographic characteristic.

6. The method of claim 1, wherein the dataset is generated using only records, in the historical session logs, of users with a shared demographic characteristic such that the AI agent learns to use the software product as a user with the demographic characteristic.

7. The method of claim 6, wherein the shared demographic characteristic is an age range.

8. The method of claim 6, wherein the shared demographic characteristic is having a sensory deficiency.

9. The method of claim 1, wherein generating the report comprises comparing, by the computing device, the historical session logs with an AI session log of the AI agent logging into and using the second version of the software product to perform the first task or the second task.

10. The method of claim 1, further comprising modifying the software product to enhance usability thereof based on the report.

11. The method of claim 1, wherein the report indicates obstacles encountered by the AI agent in completing the first task or the second task using the second version of the software product but not encountered by the AI agent in completing the first task using the first version of the software product.

12. The method of claim 11, wherein the obstacles include at least one of receiving an error message or not progressing beyond a certain point after a certain amount of time.

13. The method of claim 1, wherein the dataset is further generated using at least one of complaints, feedback, and survey responses of users.

14. The method of claim 1, wherein the report identifies a subset of users represented in the dataset as users predicted to be capable of using the second version of the software product more efficiently than an average user.

15. The method of claim 14, wherein the subset of users share a demographic characteristic, and wherein the report identifies the subset of users by identifying the demographic characteristic.

16. A method implemented by a machine learning platform, the method comprising:

receiving historical session logs with records of a plurality of users using an application;

generating one or more datasets from the historical session logs;

training a virtual user to use the application to perform tasks by using machine learning techniques on the one or more datasets and thereby develop a baseline understanding of navigating the application for the tasks, wherein training the virtual user comprises training the virtual user to use the application as a first virtual user with a first demographic characteristic and as a second virtual user with a second demographic characteristic, and determining that one of the first and second virtual users completed the task more efficiently than the other of the first and second virtual users;

presenting the virtual user with a modified application having a novel feature and directing the virtual user to complete a task using the modified application;

determining difficulty experienced by the virtual user in completing the task by analyzing virtual session logs of the virtual user completing the task using the modified application; and generating feedback on difficulty faced by the virtual user in completing the task using the modified application.

17. The method of claim 16, further comprising determining, based on difficulty determinations, identified users of a particular demographic characteristic to target for being able to efficiently complete the task.

18. The method of claim 16, further comprising modifying the application to enhance usability thereof based on the feedback.

19. A machine learning platform for training an artificial intelligence (AI) agent, the machine learning platform comprising a computing system having a processor and instructions which, when executed by the computing system, cause the computing system to:

generate a dataset using data in historical session logs that include records of multiple users logging into and using a first version of an software product;

instruct the AI agent to apply machine learning techniques to the dataset to learn to use the first version of the software product;

provide to the AI agent login credentials that grant the AI agent access to the software product;

instruct the AI agent to use the login credentials to log into and use the first version of the software product to perform a first task;

determine that the AI agent successfully performed the first task using the first version of the software product;

instruct the AI agent to use the login credentials to log into and use a second version of the software product to perform the first task or a second task, wherein the second version of the software product includes one or more new or modified features not in the first version of the software product; and generate a report based on the AI agent logging into and using the second version of the software product to perform the first task or the second task.

* * * * *